United States Patent
Lee et al.

(10) Patent No.: US 11,984,654 B2
(45) Date of Patent: May 14, 2024

(54) ANTENNA ELEMENT AND IMAGE DISPLAY DEVICE INCLUDING THE SAME

(71) Applicant: DONGWOO FINE-CHEM CO., LTD., Jeollabuk-do (KR)

(72) Inventors: Won-Hee Lee, Gyeonggi-do (KR); Young-Ju Kim, Gyeonggi-do (KR); In-Kak Song, Daejeon (KR); So-Eun Jang, Gyeonggi-do (KR)

(73) Assignee: DONGWOO FINE-CHEM CO., LTD., Jeollabuk-do (KR)

( * ) Notice: Subject to any disclaimer, the term of this patent is extended or adjusted under 35 U.S.C. 154(b) by 150 days.

(21) Appl. No.: 17/675,047

(22) Filed: Feb. 18, 2022

(65) Prior Publication Data

US 2022/0269319 A1    Aug. 25, 2022

(30) Foreign Application Priority Data

Feb. 19, 2021    (KR) .......................... 10-2021-0022245

(51) Int. Cl.
*H01Q 1/22*    (2006.01)
*H01Q 1/36*    (2006.01)
*H01Q 1/38*    (2006.01)
*G06F 1/16*    (2006.01)

(52) U.S. Cl.
CPC .............. *H01Q 1/38* (2013.01); *H01Q 1/2266* (2013.01); *H01Q 1/364* (2013.01); *G06F 1/1698* (2013.01)

(58) Field of Classification Search
CPC ...... G06F 1/1698; H01Q 1/38; H01Q 1/2266; H01Q 1/364
See application file for complete search history.

(56) References Cited

U.S. PATENT DOCUMENTS

| | | | |
|---|---|---|---|
| 9,736,933 B2* | 8/2017 | Iwami | H05K 1/0296 |
| 10,604,671 B2* | 3/2020 | Katagiri | C09D 113/02 |
| 2016/0190678 A1* | 6/2016 | Hong | H01Q 1/364 |
| | | | 343/700 MS |
| 2022/0037765 A1 | 2/2022 | Lee et al. | |

FOREIGN PATENT DOCUMENTS

| | | | | |
|---|---|---|---|---|
| JP | 2017175540 A | * | 9/2017 | .............. H01Q 1/44 |
| JP | 2020202593 A | * | 12/2020 | .............. H01Q 1/40 |
| JP | 2021-002274 A | | 1/2021 | |
| KR | WO 2019143190 A1 | * | 7/2019 | .............. H01Q 1/38 |
| KR | WO 2019172609 A1 | * | 9/2019 | .............. H01Q 1/38 |
| KR | 10-2020-0122822 A | | 10/2020 | |
| KR | 10-2166319 B1 | | 10/2020 | |

* cited by examiner

*Primary Examiner* — Hasan Islam
*Assistant Examiner* — Aladdin Abdulbaki
(74) *Attorney, Agent, or Firm* — Venable LLP

(57) ABSTRACT

The present disclosure relates to an antenna element including: a dielectric layer; a radiation electrode arranged on an upper surface of the dielectric layer and including a first mesh structure; and a dummy electrode arranged on the upper surface of the dielectric layer and including a second mesh structure, in which at least one of the radiation electrode and the dummy electrode satisfies Equation 1, and an image display device including the same.

12 Claims, 4 Drawing Sheets

ANTENNA ELEMENT AND IMAGE DISPLAY DEVICE INCLUDING THE SAME

CROSS-REFERENCE TO RELATED APPLICATION

This application claims priority to Korean Patent Application No. 10-2021-0022245, filed on Feb. 19, 2021, which is incorporated herein by reference in its entirety.

BACKGROUND

Field of the Disclosure

The present disclosure relates to an antenna element and an image display device including the same.

Description of Related Art

With the development of information technology (IT), various types of electronic devices such as a smartphone and a tablet personal computer have been widely distributed. The electronic device may wirelessly communicate with another electronic device or a base station using an antenna module. Recently, due to a rapid increase in network traffic by the electronic device, a 5th-generation mobile communication (5G) technology is being developed. When a signal in a frequency band (e.g., about 6 GHz or more) for the 5th generation mobile communication (5G) network is used, the length of the wavelength of the signal may be shortened in a unit of millimeters, and the bandwidth may be used more widely, thereby transmitting or receiving a larger amount of information. The signal in which the length of the wavelength is shortened in a unit of millimeters may be referred to as a millimeter wave signal.

Meanwhile, as a screen of a display device becomes larger, the space or area of a bezel part or a light-shielding part tends to reduce. In this case, the space or area in which the antenna may be embedded is also limited. Therefore, a radiation electrode for signal transmission and reception included in the antenna may overlap a display area of the display device. Therefore, the image of the display device may be covered by the radiation electrode of the antenna or the radiation electrode may be visually recognized by the user, thereby reducing the image quality.

Therefore, Korean Patent No. 10-2166319 discloses a transparent antenna, which may form an antenna electrode on a transparent layer made of a transparent or translucent material in a mesh pattern structure, thereby maintaining the sensitivity of the antenna even without reducing transparency.

However, the antenna element including most of the mesh pattern structures as well as the antenna element of Korean Patent No. 10-2166319 may have the electrode pattern of the antenna overlapping the display area of the display device. Therefore, the image of the display device may be covered by the electrode pattern of the antenna, or the electrode pattern of the antenna may be visually recognized by the user due to a moire phenomenon, thereby reducing the image quality.

The contents described in Description of Related Art are to help the understanding of the background of the present disclosure, and may include what is not previously known to those skilled in the art to which the present disclosure pertains.

RELATED ART DOCUMENT

[Patent Document]
(Patent Document 1) Korean Patent No. 10-2166319

SUMMARY

An object of the present disclosure is to provide an antenna element with reduced visibility of an electrode pattern of an antenna.

In addition, another object of the present disclosure is to provide an antenna element with improved transmittance and signal sensitivity.

In addition, still another object of the present disclosure is to provide an image display device including an antenna element with reduced visibility of an electrode pattern of an antenna.

In addition, yet another object of the present disclosure is to provide an image display device including an antenna element with improved transmittance and signal sensitivity.

The present disclosure relates to an antenna element including: a dielectric layer; a radiation electrode arranged on an upper surface of the dielectric layer and including a first mesh structure; and a dummy electrode arranged on the upper surface of the dielectric layer and including a second mesh structure, in which at least one of the radiation electrode and the dummy electrode satisfies Equation 1 below.

$$1 \leq (3\pi/m) \cdot 100 < 3 \qquad \text{Equation 1}$$

(In Equation 1, m refers to the average of the opening area of the mesh pattern, and σ refers to the standard deviation of the opening area of the mesh pattern.)

According to a first aspect of the present disclosure, the radiation electrode and the dummy electrode may be arranged to be spaced apart from each other by a separation region defined on the upper surface of the dielectric layer.

According to a second aspect of the present disclosure, a line width of an electrode line included in the radiation electrode and the dummy electrode may be 0.5 to 5 μm.

According to a third aspect of the present disclosure, an aperture ratio of at least one of the radiation electrode and the dummy electrode may be 90% or more.

According to a fourth aspect of the present disclosure, the first mesh structure may include: a radiation unit cell having a rhombus shape, and the second mesh structure may include: a dummy unit cell having a rhombus shape.

According to a fifth aspect of the present disclosure, the first mesh structure and the second mesh structure may include: the same mesh structure.

According to a sixth aspect of the present disclosure, each of the radiation electrode and the dummy electrode may include: one or more selected from a group consisting of gold (Au), silver (Ag), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), and an alloy comprising at least one of them.

According to a seventh aspect of the present disclosure, the antenna element may further include: a ground electrode arranged on a lower surface of the dielectric layer.

According to an eighth aspect of the present disclosure, the antenna element may further include: a transmission line electrically connected to the radiation electrode on the upper surface of the dielectric layer; and a signal pad connected to a distal end of the transmission line.

According to a ninth aspect of the present disclosure, the transmission line may include: the first mesh structure.

According to a tenth aspect of the present disclosure, the antenna element may further include: a ground pad arranged on the upper surface of the dielectric layer and arranged around the signal pad to be spaced apart from the signal pad.

According to an eleventh aspect of the present disclosure, at least one of the signal pad and the ground pad may have a solid structure.

The present disclosure relates to an image display device including the antenna element.

According to the antenna element according to the exemplary embodiment of the present disclosure, it is possible to not only reduce the visibility of the electrode pattern of the antenna by improving the parameters related to the opening of the electrode pattern, the line width, etc. of the antenna, but also to improve the transmittance and the signal sensitivity.

DETAILED DESCRIPTION

Figure 1:
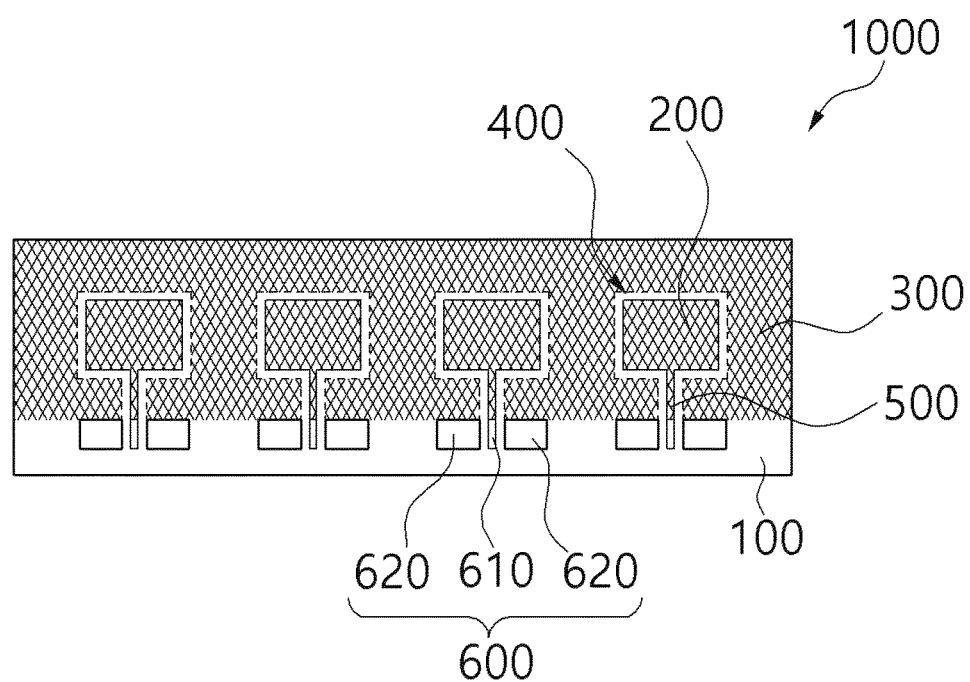
FIG. 1 is a schematic plan diagram showing an antenna element according to an exemplary embodiment of the present disclosure.

The present disclosure relates to an antenna element with improved transmittance and signal sensitivity even while reducing the visibility of an electrode pattern by improving an opening area, a standard deviation, a line width, etc. of the electrode pattern of an antenna.

Specifically, the present disclosure relates to an antenna element including: a dielectric layer; a radiation electrode arranged on an upper surface of the dielectric layer and including a first mesh structure; and a dummy electrode arranged on the upper surface of the dielectric layer and including a second mesh structure, in which at least one of the radiation electrode and the dummy electrode satisfies Equation 1 below, and an image display device including the same.

$$1 \leq (3\sigma/m) \cdot 100 < 3 \qquad \text{Equation 1}$$

(In Equation 1, m refers to the average of the opening area of the mesh pattern, and σ refers to the standard deviation of the opening area of the mesh pattern.)

The antenna element according to the present disclosure may be universally used in the art using the transmission and reception of a signal. For example, the antenna element may be used in antennas for 3rd generation mobile communication (3G) to 5th generation high frequency mobile communication (5G) and an image display device including the same. In addition, the antenna element according to the present disclosure may also be used in the field of mobile communication to be developed later within a range that does not impair the object of the present disclosure.

Hereinafter, exemplary embodiments of the present disclosure will be described in more detail with reference to the drawings. However, the following drawings attached to the present specification show preferred exemplary embodiments of the present disclosure, and serve to further understand the technical spirit of the present disclosure together with the aforementioned content of the present disclosure, and therefore, the present disclosure should not be interpreted as being limited only to the matters described in these drawings.

The terms used in the present specification are to describe the exemplary embodiments, and are not intended to limit the present disclosure. In the present specification, the singular also includes the plural unless specifically stated otherwise in the phrase.

"Comprises" and/or "comprising" used in the specification are used as the meaning that does not preclude the presence or addition of one or more other components, steps, operations, and/or elements other than the mentioned components, steps, operations, and/or elements. The same components are denoted by the same reference numerals throughout the specification.

[Below], [bottom], [under], [above], [top], and [over] that are spatially relative terms may be used to easily describe the correlation between one element or components and another element or components as shown in the drawings. Spatially relative terms should be understood as terms including different directions of the element during use or operation in addition to the directions shown in the drawings. For example, when the elements shown in the drawings are turned over, the element described as "below" or "under" another element may be placed "above" another element. Therefore, the exemplary term "below" may include both downward and upward. The element may also be oriented in other directions, and therefore, the spatially relative terms may be interpreted depending upon the orientation.

FIG. 1 is a schematic plan diagram showing an antenna element according to an exemplary embodiment of the present disclosure.

Referring to FIG. 1, an antenna element 1000 according to an exemplary embodiment may include: a dielectric layer 100, a radiation electrode 200 arranged on an upper surface of the dielectric layer, a dummy electrode 300, a separation region 400, a transmission line 500, and a pad part 600.

The dielectric layer 100 may serve to provide a structural base of components constituting the antenna element 1000.

The dielectric layer 100 may include: an insulating material having a predetermined dielectric constant, and use a conventionally or later developed one.

According to one or a plurality of exemplary embodiments, the dielectric layer 100 may include: an inorganic insulating material such as glass, silicon oxide, silicon nitride, or metal oxide, and/or an organic insulating material such as an epoxy resin, an acrylic resin, or an imide-based resin.

For example, a transparent film may be provided as the dielectric layer 100.

According to one or a plurality of exemplary embodiments, the transparent film may include: a polyester-based resin such as polyethylene terephthalate, polyethylene isophthalate, polyethylene naphthalate, and polybutylene terephthalate; a cellulose-based resin such as diacetyl cellulose or triacetyl cellulose; a polycarbonate-based resin; an acrylic-based resin such as polymethyl (meta)acrylate or polyethyl (meta)acrylate; a styrene-based resin such as polystyrene or acrylonitrile-styrene copolymer; a polyolefin-based resin such as polyethylene, polypropylene, polyolefin having a cyclo-based or norbornene structure, or an ethylene-propylene copolymer; a vinyl chloride-based resin; an amide-based resin such as nylon or aromatic polyamide; an imide-based resin; a polyether sulfone-based resin; a sulfone-based resin; a polyether ether ketone-based resin; a sulfide polyphenylene-based resin; a vinyl alcohol-based resin; a vinylidene chloride-based resin; a vinyl butyral-based resin; an allylate-based resin; a polyoxymethylene-based resin; or a thermoplastic resin such as an epoxy resin. These may be used alone or in combination of two or more. In addition, a transparent film made of a thermosetting resin such as (meta)acrylic-based, urethane-based, acrylic urethane-based, epoxy-based, or silicone-based or a UV curable resin may be used as the dielectric layer 100.

According to one or a plurality of exemplary embodiments, the dielectric constant of the dielectric layer 100 may be adjusted in a range of 1.5 to 12. If the dielectric constant exceeds 12, a driving frequency is excessively reduced, and the driving in a desired high frequency band may not be implemented.

The radiation electrode 200 serves as an electrode for transmitting or receiving the signal, and may be formed on the upper surface of the dielectric layer 100. For example, the plurality of radiation electrodes 200 may be arranged in an array form in a width direction of the dielectric layer 100 to form the row of the radiation electrode 200.

The radiation electrode 200 may include: a material having electrical conductivity, and use a conventionally or later developed one.

According to one or a plurality of exemplary embodiments, the radiation electrode 200 may include: one or more selected from a group consisting of gold (Au), silver (Ag), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), and an alloy containing at least one of them, and include: a silver-palladium-copper (APC) alloy or a copper-calcium (CuCa) alloy, for example. In addition, the radiation electrode 200 may include: a transparent conductive oxide such as indium tin oxide (ITO), indium zinc oxide (IZO), indium tin zinc oxide (ITZO), and zinc oxide (ZnOx).

According to the exemplary embodiment, the radiation electrode 200 may be formed in a multilayer structure including: a metal or a metal alloy layer; and a transparent conductive oxide layer. For example, the radiation electrode 20 may have a two-layer structure of transparent conductive oxide layer-metal layer, and a three-layer structure of transparent conductive oxide layer-metal layer-transparent conductive oxide layer. In this case, it is possible to improve a signal delivery speed by reducing a resistance while improving the flexible characteristic by the metal layer, and to improve corrosion resistance and transparency by the transparent conductive oxide layer.

According to the exemplary embodiment, the radiation electrode 200 may include: a mesh structure (a first mesh structure). If the radiation electrode 200 includes: the mesh structure, it is possible to reduce the visibility and sheet resistance of the electrode pattern, to increase the transmittance of the electrode pattern, and to improve the flexibility of the antenna element. Therefore, the antenna element may be effectively used in a flexible display device.

According to the exemplary embodiment, the radiation electrode 200 may have a polygonal plate shape, but is not limited thereto, and may be appropriately selected in consideration of the visibility of the antenna pattern, antenna performance, etc.

The dummy electrode 300 serves to prevent the radiation electrode 200 from being visually recognized by the user of the display device according to a difference in electrode arrangement for each position.

According to the exemplary embodiment, the dummy electrode 300 may be arranged around the radiation electrode 200 and the transmission line 500.

A component constituting the dummy electrode 300 are not especially limited, but may include: the same component as that of the radiation electrode 200 in terms of process economic feasibility.

According to the exemplary embodiment, the dummy electrode 300 may be arranged to be spaced apart from the radiation electrode 200, the transmission line 500, and the pad unit 600 by the separation region 400 by a predetermined spacing distance.

For example, the separation region 400 may be formed along side lines or profiles of the radiation electrode 200 and the transmission line 500 to electrically, physically separate the dummy electrode 300, the radiation electrode 200, and the transmission line 500, thereby defining the electrode pattern even without forming separate rim pattern. Therefore, it is possible to prevent the electrode caused by the rim pattern from being visually recognized.

According to the exemplary embodiment, the dummy electrode 300 may include: a mesh structure (a second mesh structure). If the dummy electrode 300 includes: the mesh structure, it is possible to reduce the visibility of the electrode pattern, particularly, the radiation electrode 200.

According to the exemplary embodiment, the second mesh structure of the dummy electrode 300 may be substantially the same line width of the electrode line, shape of the unit cell, etc. as those of the first mesh structure of the radiation electrode 200. According to some exemplary embodiments, the second mesh structure of the dummy electrode 300 may have the line width of the electrode line, the shape of the unit cell, etc. different from those of the first mesh structure of the radiation electrode 200.

The transmission line 500 may extend from one end of the radiation electrode 200 to be electrically connected to the pad part 600. According to the exemplary embodiment, the transmission line 500 may extend to protrude from the central portion of the radiation electrode 200, and have the width narrower than the radiation electrode 200.

The transmission line 500 may include: a material having electrical conductivity, and use a conventionally or later developed one. According to the exemplary embodiment, the transmission line 500 may include: substantially the same material as that of the radiation electrode 200, and be formed through substantially the same etching process. In this case, the transmission line 500 may be formed integrally with the radiation electrode 200 and provided as a substantially single member.

According to the exemplary embodiment, the transmission line 500 may include: the mesh structure substantially the same as that of the radiation electrode 200.

The pad part 600 may include: a signal pad 610 and a ground pad 620.

The signal pad 610 may be electrically connected to the radiation electrode 200 through the transmission line 500, and may serve to electrically connect a driving circuit part such as an IC chip with the radiation electrode 200.

According to the exemplary embodiment, the signal pad 610 may be provided as a member substantially integrated with the transmission line 500, and the distal end of the transmission line 500 may be provided as the signal pad 610.

According to the exemplary embodiment, a circuit board such as a flexible printed circuit board (FPCB) may be bonded to the signal pad 610, and the driving circuit part may be arranged on the flexible printed circuit board (FPCB). Therefore, the signal may be transmitted or received between the radiation electrode 200 and the driving circuit part.

According to the exemplary embodiment, the pad unit 600 may have a pair of ground pads 620 arranged to be electrically, physically spaced apart from the signal pad 610 and to face the signal pad 610 with the signal pad 610 interposed therebetween.

According to the exemplary embodiment, the signal pad 610 and/or the ground pad 620 may have a solid structure including the aforementioned metal or alloy to reduce the signal resistance.

The antenna element according to the exemplary embodiment may further include: a ground electrode arranged on a bottom surface of the dielectric layer.

The ground electrode forms a capacitance or an inductance in a thickness direction of the antenna element between the radiation electrode and the ground electrode by the dielectric layer to adjust the frequency band in which the antenna element may be driven or sensed.

According to the exemplary embodiment, the antenna element may be provided as a vertical radiation antenna through the ground electrode.

According to the exemplary embodiment, the ground electrode may include: the aforementioned metal, alloy, transparent conductive oxide, etc., and include: the mesh structure substantially the same as that of the radiation electrode and/or the dummy electrode. In this case, it is possible to improve the transmittance of the antenna element, and to reduce the visibility of the electrode pattern by overlapping different shapes of the conductive patterns.

For convenience of explanation, the antenna element 1000 including: four radiation electrodes 200 is shown in FIG. 1, but is not limited thereto, and may include: a single or a plurality of radiation electrodes 200. In this case, the ground electrode may be formed to have a sufficient area to cover all of the array formed by the radiation electrode 200.

According to some exemplary embodiments, the ground electrode may also include: the radiation electrode (e.g., a lower radiation electrode) and the dummy electrode (e.g., a lower dummy electrode) as shown in FIG. 1, and the radiation electrode and the dummy electrode of the ground electrode may include: the first mesh structure and/or the second mesh structure.

In this case, the antenna element may be provided as a double-sided radiating antenna in which antenna radiation is performed through each of the upper and lower surfaces of the dielectric layer 100.

According to the exemplary embodiment, the lower dummy electrode arranged on the bottom surface of the dielectric layer may overlap the radiation electrode arranged on the top surface of the dielectric layer in the thickness direction.

Figure 2:
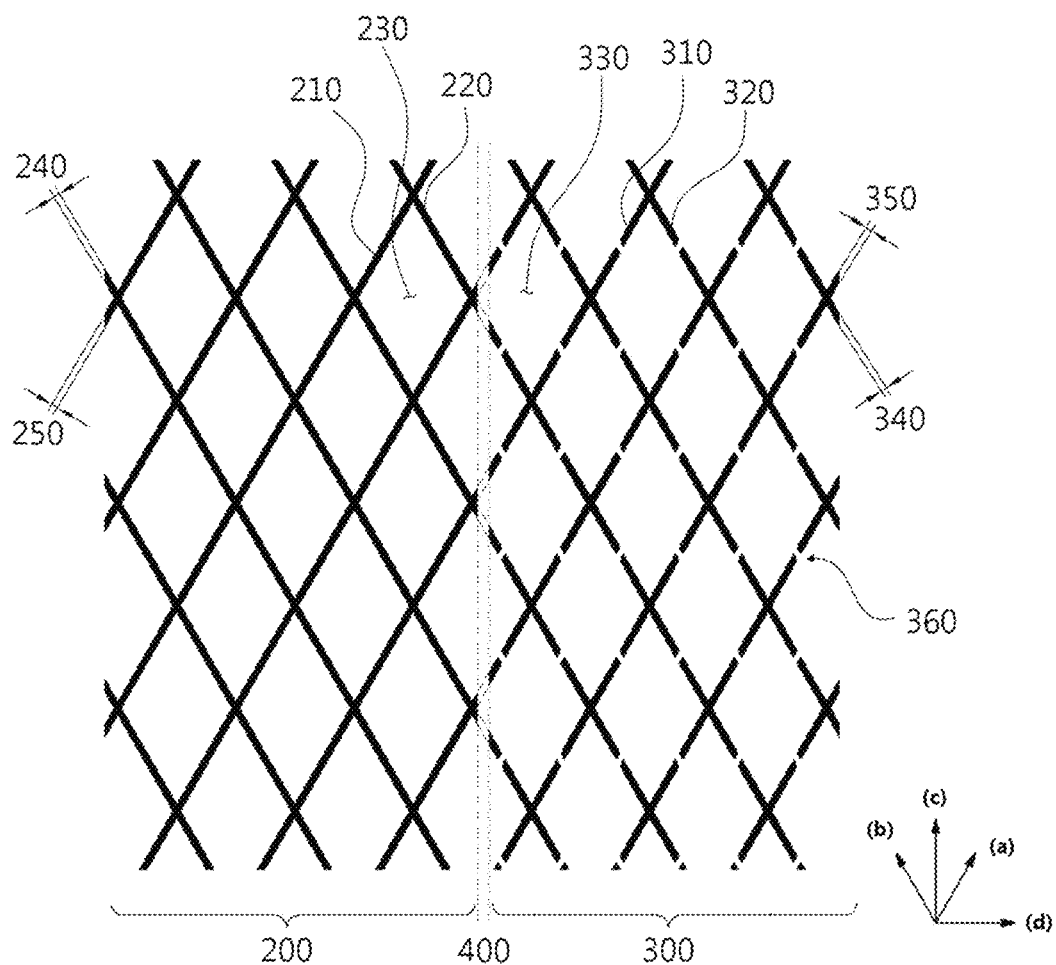
FIG. 2 is a schematic plan diagram for explaining an electrode pattern of the antenna element according to the exemplary embodiment of the present disclosure. ((a) FIRST DIRECTION; (b) SECOND DIRECTION; (c) THIRD DIRECTION and (d) FOURTH DIRECTION)

FIG. 2 is a schematic plan diagram for explaining an electrode pattern of the antenna element according to the exemplary embodiment of the present disclosure.

Referring to FIG. 2, the first mesh structure included in the radiation electrode 200 may have a plurality of first radiation electrode lines 210 extending in a first direction and a plurality of second radiation electrode lines 220 extending in a second direction formed to intersect each other.

The line widths 240, 250 of the radiation electrode lines 210, 220 may be 0.5 to 5 µm, preferably, 1.5 to 4 µm, and more preferably, 2 to 3 µm. If the line widths of the radiation electrode lines 210, 220 satisfy the above range, there is an advantage in terms of the visibility of the electrode pattern and the reduction in sheet resistance.

The first mesh structure may include: a radiation unit cell 230 defined by intersecting a pair of adjacent first radiation electrode lines 210 and a pair of adjacent second radiation electrode lines 220. According to the exemplary embodiment, the radiation unit cell 230 may have a substantially rhombus shape, but is not limited thereto and may have a polygonal shape such as a hexagon.

The second mesh structure included in the dummy electrode 300 may have a plurality of first dummy electrode lines 310 extending in the first direction and a plurality of second dummy electrode lines 320 extending in the second direction formed to intersect each other.

The line widths 340, 350 of the dummy electrode lines 310, 320 may be 0.5 to 5 µm, preferably, 1.5 to 4 µm, and more preferably, 2 to 3 µm. If the line widths of the dummy electrode lines 310, 320 satisfy the above range, there is an advantage in terms of the visibility of the electrode pattern and the reduction in sheet resistance.

The second mesh structure may include: a dummy unit cell 330 defined by intersecting a pair of adjacent first dummy electrode lines 310 and a pair of adjacent second dummy electrode lines 320. According to the exemplary embodiment, the dummy unit cell 330 may have a substantially rhombus shape, but is not limited thereto and may have a polygonal shape such as a hexagon.

According to the exemplary embodiment, the dummy electrode lines 310, 320 may include: one or more cutout parts 360. In this case, if the antenna element 1000 is coupled to the touch sensor, etc., there is an advantage in that it is possible to prevent the sensing disturbance of the touch sensor caused by the dummy electrode lines 310, 320 through the cutout part 360, the generation of parasitic capacitance, etc.

The width of the cutout part 360 may be 0.5 to 5 µm, preferably, 1.5 to 4 µm, and more preferably, 2 to 3 µm.

According to the exemplary embodiment, as shown in FIG. 2, one cutout part 360 is provided in a pair of first dummy electrode lines 310 and a pair of second dummy electrode lines 320 constituting the dummy unit cell 330, respectively, and a total of four cutout parts 360 per dummy unit cell 330 may be provided, but is not necessarily limited thereto, and the region where the cutout part is provided and the number thereof may be appropriately selected according to the user's needs. For example, the cutout part 360 may be formed only on any one pair of a pair of first dummy electrode lines and a pair of second dummy electrode lines constituting the dummy unit cell, and formed only on any one of the pair of dummy electrode lines, and a plurality of cutout parts may be provided in any one dummy electrode line constituting the dummy unit cell.

An aperture ratio of at least one of the radiation electrode 200 and the dummy electrode 300 may be 90% or more, and preferably, 93% or more.

The aperture ratio is defined as a ratio of the area occupied by the radiation unit cell 230 and/or the dummy unit cell 330 to the total area occupied by the radiation electrode 200 and/or the dummy electrode 300.

If the aperture ratio of the radiation electrode 200 and/or the dummy electrode 300 satisfies the above range, it is possible to prevent the image of the image display device from being covered by the electrode pattern, thereby preventing the reduction in the image quality.

For the antenna element according to the present disclosure, at least one of the radiation electrode and the dummy electrode may satisfy Equation 1 below.

$$1 \le (3\sigma/m) \cdot 100 < 3 \qquad \text{Equation 1}$$

(In Equation 1, m refers to the average of the opening area of the mesh pattern, and σ refers to the standard deviation of the opening area of the mesh pattern.)

Equation 1 may also be expressed as Equation 2 below.

$$1 \le (((m+1.5\sigma) - (m-1.5\sigma))/m) \cdot 100 < 3 \qquad \text{Equation 2}$$

(In Equation 2, m and σ represent the same meaning as in Equation 1.)

The opening of the mesh pattern is defined as the opening formed by the radiation unit cell 230 and the dummy unit cell 330.

The opening area of the mesh pattern refers to an area excluding the area occupied by the electrode lines 210, 220, 310, and 320 in the region defined by the radiation electrode 200 and/or the dummy electrode 300, that is, the total area occupied by the radiation unit cell 230 and/or the dummy unit cell 330.

If at least one of the radiation electrode 200 and the dummy electrode 300 satisfies Equation 1, it is possible to effectively prevent moire, etc. caused by the electrode pattern of the antenna, thereby reducing visibility and at the same time, to reduce the sheet resistance, thereby improving the signal sensitivity.

According to the exemplary embodiment, the average of the opening area of the mesh pattern indicated by m in Equation 1 or 2 and the standard deviation of the opening area of the mesh pattern indicated by σ therein may be calculated by the following method.

First, the maximum line width and the minimum line width are obtained by measuring the line widths of the electrode lines 210, 220, 310, and 320 constituting the mesh pattern. Thereafter, assuming an ideal mesh pattern composed of only the electrode lines having the maximum line width and the minimum line width, the opening area of the ideal mesh pattern composed of only the electrode line having the maximum line width and the opening area of the ideal mesh pattern composed of only the electrode line having the minimum line width are calculated. Thereafter, the average of the opening area of the mesh pattern indicated by m in Equation 1 or 2, and the standard derivation of the opening area of the mesh pattern indicated by σ therein are calculated by calculating the average and standard deviation between the calculated opening area having the maximum line width and opening area having the minimum line width of the ideal mesh pattern.

The method for calculating the average and standard deviation of the opening area of the mesh pattern described above is illustrative, and is not necessarily limited thereto, and may be obtained by a method appropriately selected by the user. For example, the average and standard deviation of the opening area of the mesh pattern may be calculated by adding a line width corresponding to a median value in addition to the maximum line width and the minimum line width.

Meanwhile, specifically explaining the meaning of Equation 1 or 2 described above, when a graph probability variable (X) of the standard normal distribution follows N (m, σ2), the probability in which X is included in a range of ±1.56 or less from the average value (m) is 86.64%. Therefore, in Equation 2, ⌈m+1.5σ⌋ refers to the maximum value of the opening area in the range of 86.64% around the average among the opening area values on the assumption that the area distribution of the opening included in the radiation electrode 200 and/or the dummy electrode 300 to be objected (i.e., the radiation unit cell 230 and/or the dummy unit cell 330) follows the normal distribution.

As in the above, ⌈m−1.5σ⌋ refers to the minimum value of the opening area in the range of 86.64% around the average among the opening area values on the assumption that the area distribution of the opening included in the radiation electrode 200 and/or the dummy electrode 300 to be objected (i.e., the radiation unit cell 230 and/or the dummy unit cell 330) follows the normal distribution.

Therefore, if Equations 1 and 2 are satisfied, that is, if the ratio to the average value (m) of ⌈3σ⌋, which is the difference between ⌈m+1.5σ⌋ and ⌈m−1.5σ⌋, is 1% or more and less than 3%, the visibility of the electrode pattern may be reduced when the antenna element and the image display device are coupled and used.

Figure 3:
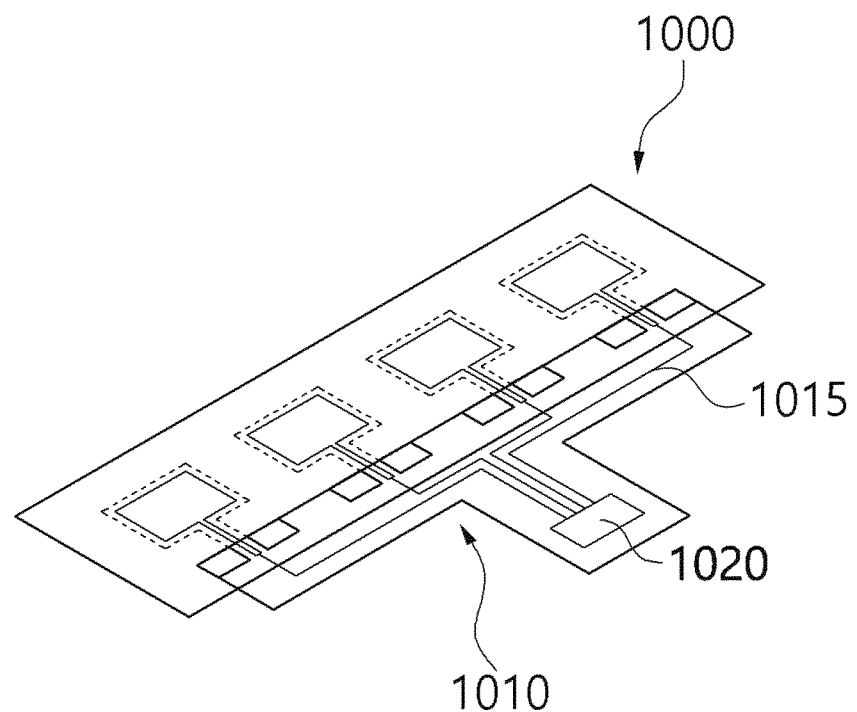
FIG. 3 is a schematic perspective diagram showing a part of an antenna package according to the exemplary embodiment of the present disclosure.
Figure 4:
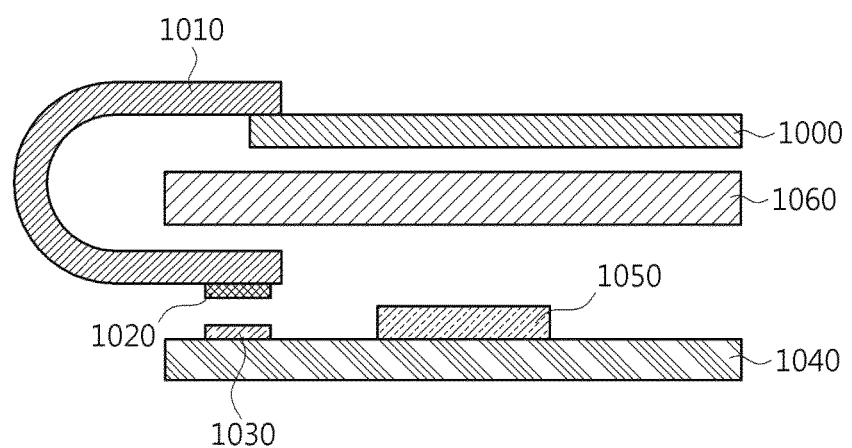
FIGS. 4 and 5 are diagrams for explaining an image display device according to the exemplary embodiment of the present disclosure.
Figure 5:
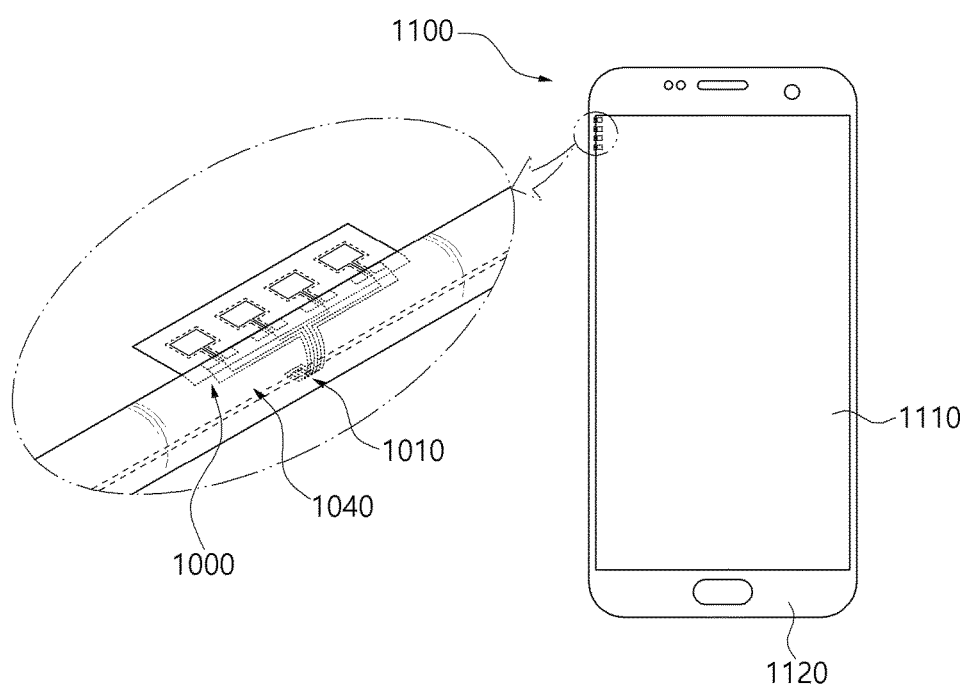

FIG. 3 is a schematic perspective diagram showing a part of an antenna package according to the exemplary embodiment of the present disclosure, and FIGS. 4 and 5 are diagrams for explaining an image display device according to the exemplary embodiment of the present disclosure.

Referring to FIG. 3, the antenna element 1000 according to the present disclosure may be coupled with a first circuit board 1010 (e.g., FPCB) to constitute a part of the antenna package.

The first circuit board 1010 may include: a base part, and a signal wiring 1015 and a connector 1020 formed on an upper surface of the base part.

According to some exemplary embodiments, the dielectric layer 100 of the antenna element 1000 may be provided as the first circuit board 1010. In this case, the first circuit board 1010 may be formed substantially integrally with the dielectric layer 100, and the signal wiring 1015 may be directly connected to the transmission line 500 to omit the signal pad 610.

The signal wiring 1015 may be connected to or bonded to the signal pad 610 of the antenna element 1000. For example, after attaching a conductive bonding structure such as an anisotropic conductive film (ACF) on the signal pad 610, one end of the signal wiring 1015 may be arranged to be positioned on the conductive bonding structure. Thereafter, the signal wiring 1015 may be electrically connected to the signal pad 610 through a heat treatment and/or pressurization process.

The connector 1020 may be provided to be connected to a connector 1030 mounted on a second circuit board 1040 to be described later, and may be, for example, a board-to-board (B2B) connector.

According to the exemplary embodiment, the connector 1020 may be mounted through a surface mount technology (SMT) to be electrically connected to the distal ends of the plurality of signal wirings 1015.

Referring to FIGS. 4 and 5, the image display device 1100 may include: the antenna element 1000 and the first circuit board 1010 described above, and the image display device 1100 may be, for example, implemented in the form of a smartphone.

A front portion of the image display device 1100 may include: a display region 1110 and a non-display region 1120. The non-display region 1120 may correspond to, for example, a light-shielding part or a bezel part of the image display device.

The antenna element 1000 may be provided on one side surface of the image display device 1100 and arranged toward the front portion thereof, and for example, arranged on a display panel 1060. According to the exemplary embodiment, the radiation electrode 200 may at least partially overlap the display region 1110, and the pad part 600 may be formed of a solid metal pattern, and arranged on the non-display region 1120 to prevent the reduction in the image quality.

According to some exemplary embodiments, the first circuit board 1010 (e.g., FPCB) may be arranged on a rear surface of the image display device 1100, including a bent portion thereof, and may extend toward the second circuit board 1040 (e.g., main board) on which an antenna driving IC chip 1050 is mounted.

The first circuit board 1010 and the second circuit board 1040 may be interconnected through connectors 1020, 1030 to implement the power supply to the antenna element 1000 through the antenna driving IC chip 1050 and a driving control of the antenna.

As described above, it is possible to stably provide the circuit connection through the bending using the pad arrangement structure of the connectors 1020, 1030, and to effectively apply a high frequency or an ultra-high frequency antenna to the image display device 1100.

Meanwhile, FIGS. 4 and 5 exemplarily show the exemplary embodiment of the present disclosure, and the present disclosure is not necessarily limited thereto, and those skilled in the art may appropriately change and practice the present disclosure within a range that does not impair the object of the present disclosure as described above. Therefore, the antenna element may be provided at a position different from that shown in FIG. 5, and positioned, for example, at an upper end or a lower end of the display region 1110. In addition, the image display device may include: a plurality of antenna elements, and the plurality of antenna elements may be provided at any position of the image display device without departing from the object of the present disclosure. For example, at least one antenna element may be provided on the upper and lower end of the display region of the image display device, respectively, at least one antenna element may be provided on both side surfaces thereof, respectively, and at least one antenna element may be provided on the upper end, the lower end, and both side surfaces thereof, respectively.

Hereinafter, examples of the present disclosure will be specifically described. However, the present disclosure is not limited to the examples disclosed below, but may be implemented in various different forms, and only these examples allow the disclosure of the present disclosure to be complete, and are provided to fully inform those skilled in the art to which the present disclosure pertains of the scope of the disclosure, and the present disclosure may be defined only by the scope of claims.

<EXAMPLE AND COMPARATIVE EXAMPLE>: PRODUCTION OF THE ANTENNA ELEMENT

Example 1

An electrode pattern having a mesh structure in which each of an X-axis and a Y-axis is 3,000 μm was formed on an upper surface of a glass (0.7 T) dielectric layer using a copper-calcium (CuCa) alloy, respectively, and a ground electrode was formed by depositing the copper-calcium (CuCa) alloy on a lower surface of the dielectric layer. An antenna element of Example 1 was produced by forming the thickness (or height) of the electrode included in the mesh structure to have the thickness of 2000 Å, and setting the short diagonal length of a rhombic unit cell included in the electrode pattern as 200 μm and the long diagonal length as 400 μm.

The minimum line width, intermediate line width, and maximum line width of the antenna element of Example 1 were measured, and the result according to Equation 1 calculated by using the average and standard deviation of an opening area of an ideal mesh pattern according to the respective line widths operated by using an SX-Meister (ISMO) (from Jedat) is shown in Table 1 below.

$$1 \le (3\sigma/m)\cdot 100 < 3 \qquad \text{Equation 1}$$

(In Equation 1, m refers to the average of the opening area of the mesh pattern, and σ refers to the standard deviation of the opening area of the mesh pattern.)

TABLE 1

| | Entire area | Opening area | Opening rate | Average area (m) | Standard deviation (σ) | Calculated result |
|---|---|---|---|---|---|---|
| Minimum line width (2 μm) | 9,000,000 μm² | 8,675,169 μm² | 96.39% | 8,593,003 μm² | 82,208.12 μm² | 2.87006 |
| Intermediate line width (2.5 μm) | 9,000,000 μm² | 8,593,089 μm² | 95.48% | | | |
| Maximum line width (3 μm) | 9,000,000 μm² | 8,510,753 μm² | 94.56% | | | |

Example 2

An antenna element of Example 2 was produced in the same manner as in Example 1 except that it was configured so that the calculated result according to Equation 1 was 1.

Comparative Example 1

An antenna element of Comparative Example 1 was produced in the same manner as in Comparative Example 1 except that it was configured so that the calculated result according to Equation 1 was 3.5.

Experimental Example

Electrode Pattern Visibility Evaluation

The antenna element samples of Examples and Comparative Example were visually observed to evaluate whether the electrode line or the mesh structure was visually recognized.

Specifically, the samples were visually observed by 10 evaluators for evaluation, and visibility was evaluated through the number of evaluators who evaluated that the electrode pattern was clearly, visually recognized, and the evaluation results are shown in Table 2 below.

<Evaluation Criteria for Electrode Pattern Visibility>
⊚: 0 out of 10
○: 1 to 3 out of 10
Δ: 4 and 5 out of 10
X: 6 or more out of 10

Electrode Pattern Electrical Conductivity Evaluation

The conductivity of the electrode patterns of the antenna elements of Examples and Comparative Example was measured by using a Hall Effect Measurement System (HMS-5300, manufactured by Ecopia).

Specifically, the conductivity was measured by producing an electrode pattern of an antenna element (1 cm×1 cm) in a square shape, arranging it on a stage in equipment, and grounding a probe, and the measurement results are shown in Table 2 below.

Antenna Characteristics Evaluation

For the antenna elements of Examples and Comparative Example, antenna characteristics (S parameters) were evaluated by using an S-parameter measuring apparatus (Vector Network Analyzer MS46522B manufactured by Anritsu).

Specifically, the apparatus evaluated the S parameter (S11) by measuring the changes in the input/output of the current for the antenna pattern in a probe contact method, and the evaluation results are shown in Table 2 below.

TABLE 2

| Items | Visibility evaluation | Electrical conductivity evaluation (1/Ω cm) | Antenna characteristics (gain) |
|---|---|---|---|
| Example 1 | ○ | 2.55E+05 | 7.9 dBi |
| Example 2 | ⊚ | 2.87E+05 | 8.1 dBi |
| Comparative Example 1 | Δ | 2.21E+05 | 7.7 dBi |

Referring to the contents of Table 2, it may be seen that the antenna element according to the present disclosure effectively reduces the visibility of the electrode pattern of the antenna, and represents the excellent electrical conductivity and antenna characteristics (gain).

What is claimed is:

1. An antenna element comprising:
   a dielectric layer;
   a radiation electrode arranged on an upper surface of the dielectric layer and comprising a first mesh structure; and
   a dummy electrode arranged on the upper surface of the dielectric layer and comprising a second mesh structure,
   wherein the first mesh structure comprises a radiation unit cell having a polygonal shape, and the second mesh structure comprises a dummy unit cell having a polygonal shape,
   wherein the polygonal shape of the radiation unit cell and the polygonal shape of the dummy unit cell are substantially identical, and
   wherein at least one of the radiation electrode and the dummy electrode satisfies Equation 1 below $$1 \le (3\sigma/m) \cdot 100 < 3 \quad \text{Equation 1}$$

where m refers to an average of an opening area of at least one of the first mesh structure and the second mesh structure, and σ refers to a standard deviation of the opening area of the at least one of the first mesh structure and the second mesh structure.

2. The antenna element of claim 1, wherein the radiation electrode and the dummy electrode are arranged to be spaced apart from each other by a separation region defined on the upper surface of the dielectric layer.

3. The antenna element of claim 1, wherein a line width of an electrode line comprised in the radiation electrode and the dummy electrode is 0.5 to 5 μm.

4. The antenna element of claim 1, wherein an aperture ratio of at least one of the radiation electrode and the dummy electrode is 90% or more.

5. The antenna element of claim 1, wherein the first mesh structure comprises: a radiation unit cell having a rhombus shape, and the second mesh structure comprises: a dummy unit cell having a rhombus shape.

6. The antenna element of claim 1, wherein each of the radiation electrode and the dummy electrode comprises: one or more selected from a group consisting of gold (Au), silver (Ag), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), and an alloy comprising at least one of them.

7. The antenna element of claim 1, further comprising: a ground electrode arranged on a lower surface of the dielectric layer.

8. The antenna element of claim 1, further comprising: a transmission line electrically connected to the radiation electrode on the upper surface of the dielectric layer; and
   a signal pad connected to a distal end of the transmission line.

9. The antenna element of claim 8, wherein the transmission line comprises: the first mesh structure.

10. The antenna element of claim 8, further comprising: a ground pad arranged on the upper surface of the dielectric layer and arranged around the signal pad to be spaced apart from the signal pad.

11. The antenna element of claim 10, wherein at least one of the signal pad and the ground pad has a solid structure.

12. An image display device comprising: the antenna element of claim 1.

* * * * *